United States Patent
Ilnicki et al.

(10) Patent No.: US 7,760,663 B2
(45) Date of Patent: Jul. 20, 2010

(54) PACKET TRACING USING DYNAMIC PACKET FILTERS

(75) Inventors: Slawomir K. Ilnicki, Los Altos Hills, CA (US); Lance A. Tatman, Fremont, CA (US)

(73) Assignee: JDS Uniphase Corporation, Milpitas, CA (US)

(*) Notice: Subject to any disclaimer, the term of this patent is extended or adjusted under 35 U.S.C. 154(b) by 1845 days.

(21) Appl. No.: 10/834,607

(22) Filed: Apr. 28, 2004

(65) Prior Publication Data

US 2005/0232239 A1    Oct. 20, 2005

(51) Int. Cl.
*H04L 12/28* (2006.01)

(52) U.S. Cl. ............ 370/254; 370/252; 370/360; 709/224

(58) Field of Classification Search ......... 370/229–258, 370/352, 401, 360; 709/220, 224; 713/201; 340/825
See application file for complete search history.

(56) References Cited

U.S. PATENT DOCUMENTS

| | | | |
|---|---|---|---|
| 6,363,056 B1 | 3/2002 | Beigi et al. | |
| 6,442,141 B1* | 8/2002 | Borella et al. | 370/248 |
| 2002/0143905 A1* | 10/2002 | Govindarajan et al. | 709/220 |
| 2003/0039212 A1 | 2/2003 | Lloyd et al. | |
| 2003/0128692 A1* | 7/2003 | Mitsumori et al. | 370/352 |
| 2003/0214913 A1* | 11/2003 | Kan et al. | 370/252 |
| 2004/0064725 A1* | 4/2004 | Padmanabhan et al. | 713/201 |
| 2004/0120269 A1* | 6/2004 | Sumino et al. | 370/255 |
| 2005/0108760 A1* | 5/2005 | Iwamura | 725/80 |
| 2006/0098586 A1* | 5/2006 | Farrell et al. | 370/254 |

FOREIGN PATENT DOCUMENTS

EP    1 401 147    9/2002

OTHER PUBLICATIONS

European Search Report dated Jun. 23, 2005—2 pages.

* cited by examiner

*Primary Examiner*—Fan Tsang
*Assistant Examiner*—Simon King
(74) *Attorney, Agent, or Firm*—Matthew A. Pequignot; Pequignot + Myers LLC

(57) ABSTRACT

Packet tracing in switched packet networks. Tracing of live packet data in a network is performed by discovering the measurement path, setting up dynamic filters along the path to collect traffic information, and collecting data as detected by the dynamic filters. Collected data is sent to a measuring entity. Filter setup may be repeated to capture data as routing changes.

18 Claims, 2 Drawing Sheets

US 7,760,663 B2

PACKET TRACING USING DYNAMIC PACKET FILTERS

TECHNICAL FIELD

Embodiments in accordance with the invention relate generally to tracing IP packets through digital networks.

BACKGROUND

Modern digital networks are IP networks, based on packet-switched Internet Protocols. Packets of information travel from a source node connected to the network to a destination node connected to the network. The path these packets take through the myriad of possible routes through the network is chosen by routers, and may change. The path between source and destination may not be the same for each packet, and may not be the same in each direction.

This routing poses a question which is simple to ask, but difficult to answer: what path does a packet take through the network?

Tracing a path of IP packets through the network is generally accomplished by using the well-known traceroute utility. Traceroute attempts to report the route or path (the set of IP addresses of router interfaces) through which a certain type of packet (a UDP packet) travels to reach a particular destination port. Traceroute manipulates the time-to-live (TTL) attribute of the packets in the IP packet header it sends to get such information. The TTL attribute of a packet as used by traceroute is not a timer in the clock or time-of-day sense, but rather a counter which is decremented each time the packet passes through a router. When TTL is decremented to zero, the packet is dropped, and the router returns an ICMP Timer Expired message to the sender, including its own IP address as a source IP address in the IP packet header. So, by beginning with a TTL of 1 and incrementing the TTL until the destination is reached, a path may be "traced." However, this "traced path" is an aggregate path which represents only a theoretical route, as it is built from a series of UDP packets. The path traced may not represent the actual path taken by packets, as the route may change during the mapping process. Additionally, the path is only traced in a single direction, and there is no guarantee that return traffic takes a reciprocal route. Nevertheless, the traceroute tool gives an approximate path with approximate round trip delays to each hop on a path that in many cases is good enough for network troubleshooting.

The ping utility also provides a round trip delay measurement between source and destination, but does not report on the path itself. Ping uses ICMP echo messages and ICMP echo reply messages. Because it uses ICMP messages, it may not provide an accurate measurement of real traffic round trip delay. ICMP messages may be routed differently than other network traffic, for example using different priorities or different routes. In addition, routers are usually designed to drop ICMP messages when the router becomes congested.

Approaches such as traceroute, ping, and their derivatives rely on special packet types, and provide aggregate data based on special test packets. These two techniques rely on active measurement by inserting special packets into the network. Such special packets may not be routed through the network in the same way as other traffic. Providing reliable information on packet routing involves measuring real traffic. Such information includes information on how long it takes a specific packet to travel from one node to another. As networks may have congestion points which introduce packet jitter, knowledge of congestion points and jitter is very often essential in determining network problems or anomalies.

What is needed is a way to obtain unidirectional IP path information on real network data, including timestamping of intercepted packets.

SUMMARY

In accordance with the invention, automatic packet tracing from a source to a destination takes place in three phases, discovery, dynamic filter setup, and data collection. In the discovery phase, determinations are made about the measurement path start and end. In the second phase, dynamic packet filter setup, packet filters are set up along the path to capture specific traffic. The last phase, data collection, occurs where time-stamped packet header information is captured according to the deployed dynamic packet filters, and the data is delivered to the measuring party. Dynamic filter setup may be repeated to track routing changes.

BRIEF DESCRIPTION OF THE DRAWINGS

The invention will best be understood by reference to the following detailed description of embodiments in accordance with the invention when read in conjunction with the accompanying drawings, wherein.

DETAILED DESCRIPTION

The invention relates to packet tracing in packet-based networks. The following description is presented to enable one skilled in the art to make and use the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments show but is to be accorded the widest scope consistent with the appended claims and with the principles and features described herein.

Figure 1:
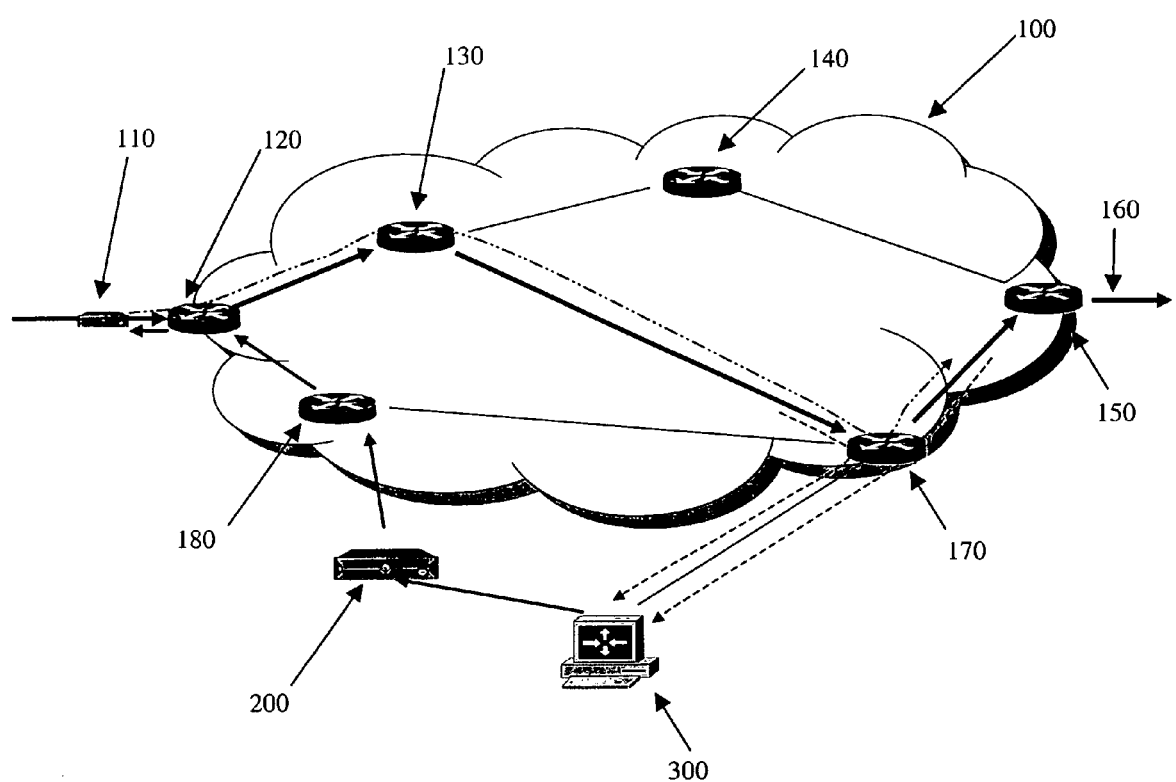
FIG. 1 shows a packet switched network.
Figure 2:
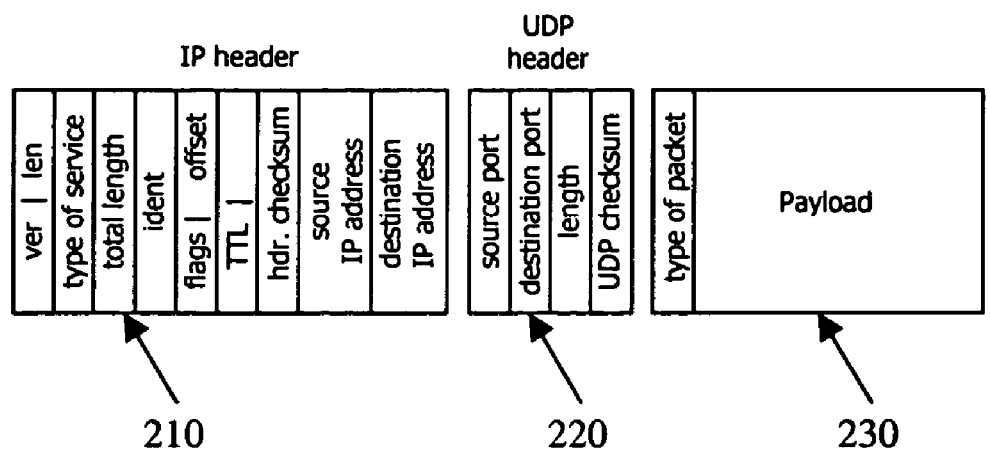
FIG. 2 shows a probe configuration packet.
Figure 3:
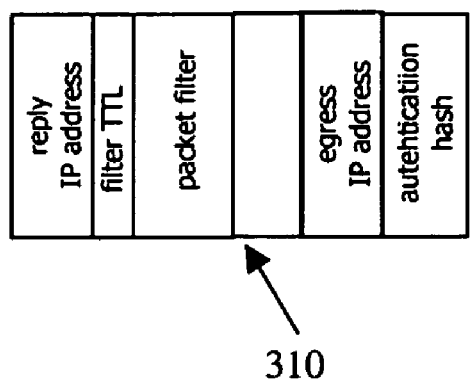
FIG. 3 shows a filter information packet.

With reference now to the figures and in particular with reference to FIGS. 1 through 3, representative embodiments of the invention are shown.

FIG. 1 shows network 100 with routers 120, 130, 140, 150, 170, and 180. As shown, multiple paths exist between starting point 110 and exit path 160.

Packet tracing according to the present invention takes place in three phases: discovery, dynamic filter setup, and data collection. Filter setup may be performed from a remote location using proxies built into interface probes. Filter packet setup discovers the path by mimicking actual traffic, and allows traffic data capture even when there are routing changes. Data is collected on real traffic using passive eavesdropping. Collected data is sent to a measuring station, which may be separate from the starting and ending nodes on the network. The collected data may also include timing information such as packet arrival time.

This packet tracing and data collection is organized and initiated by a measuring entity which may not be connected with the start and end points of the path being measured. As an example, such measurements may be performed by a third party on the request of an Autonomous System (AS) operator who wishes to better understand traffic flowing between two points of a network. FIG. 1 shows measuring entity 300 and probe manager 200 outside network 100.

It is assumed that relevant tracing entities along the network are routers or probes capable of accepting and installing configurable filters. Messages may be sent to a tracing entity for example to set up a filter or destroy a filter. A tracing entity may require authentication of the received packet filter configuration message prior to accepting a filter. Instantiated filters typically have a set lifetime, usually referred to as "Time To Live," or TTL, after which they expire. For the purposes of this application, times ranging from seconds to hours may be used. While in operation, the tracing entities passively monitor traffic, and collect information according to active filter specifications; more than one filter may be active at any given time. Collected information is sent to a measuring entity that collects and analyzes data, specified as the destination in the filter. Such filtering functionality may be built into a router or probe. An example which could provide suitable implementation of configurable filter support could be a GBIC (GigaBit Interface Converter) module including filtering support. GBIC modules are used to interface media such as optical fiber or copper wires to network equipment such as hubs, switches, routers, and the like. Such an implementation is described in the patent application "Assisted Port Monitoring with Distributed Filtering," Ser. No. 10/407,719, incorporated herein by reference.

According to the present invention, the measuring entity specifies what type of traffic is to be monitored, and for what period of time. Specification of traffic in this context means information including but not limited to: application destination port, protocol, and source and destination IP addresses. Note that IP addresses may be IP prefixes representing sets or subnets of sources and/or destinations as defined in well known Classless Inter-Domain Routing (CIDR) standards.

In the first phase, discovery, a determination of the source and destination points on the network is made. Measuring entity 300 passes packet filter information such as source and destination IP addresses, destination port, and protocol, for example, to probe manager 200. Probe manager 200 may be part of the network to be probed, or may be external to it. Probe manager 200 may also be part of measuring entity 300.

The probe manager, on verifying access to the required measurement infrastructure, suggests to the measuring entity possible starting points for traffic matching the filter by analyzing routing information. For example, a specific staring interface (probe or router) may be determined by analyzing BGP or OSPF tables and router configuration information, which port of which router is configured with what peer.

The probe manager may also maintain a mapping of probe IP addresses and router ports so that mapping which starting point to use for testing may be more easily determined. Once this determination is made, and if there is more than one starting point, the measuring entity may narrow the choices by checking for the presence of the desired traffic flowing through the identified potential starting points. This may not be necessary if the entity already collects such information using other means such as sniffers for traffic flow analysis. If the measuring entity decides which interfaces to use prior to the beginning of the measurement, then the entity will ask the probe manager to set a packet filter at the start point(s) and begin collecting data.

Once the starting point is determined, the measuring entity may wish to define the end of the measuring path. In the case of tracking packets through his own AS, this may not be needed because tracing will terminate at the egress of the network. If the requirement is to trace packets within a certain perimeter, such as the core, or over a backbone network, then an end point will need to be determined. Note that the starting and ending points of the tracing operation may be different than the source and destination of the packet traffic being traced.

For the following discussion, one starting point will be assumed, although the invention is equally applicable to multiple starting points. As shown in FIG. 1, node 110 is selected as the starting point.

According to the present invention, once the starting point is determined, the probe manager creates a filter setup packet which is sent to the starting point proxy to set up filters at the starting probe tracing entity. The starting point tracing entity then forwards the filter setup along to the destination.

As shown in FIG. 1, this packet is sent from probe manager 200 through router 180 to router 120 to starting node 110.

Note that this filter setup packet is "wrapped" to resemble the same type of traffic as the traffic to be traced. This insures that the setup packets will follow a route similar to that of the actual traffic. This is shown in the example probe configuration packet of FIG. 2 having IP header 210, UDP header 220, and filter payload 230. FIG. 3 shows more detail of payload 230 as filter information packet 310. The fields shown in FIGS. 2 and 3 are exemplary in nature and will vary depending on the actual protocols and filter specifications in use.

At each point along the route where the filter setup packet is recognized by a suitable tracing entity, the filter setup information is extracted. Since filter resources are limited, the tracing entity may not be able to accept a filter or set of filters. If the tracing entity can accept the filter, the filter is installed. In either case, an optional status message signifying success or failure of filter instantiation may be sent to the probe manager. Then the filter setup packet is passed along toward the destination.

As shown in FIG. 1, the filter setup packet from probe manager 200 is unwrapped at node 110, and from there forwarded along the network to destination path 160. As an example, assume the packet travels from router 120 through routers 130, 170, and 150 to reach destination path 160.

Note that because any active trace or probe configuration packet may disrupt the destination application, the source IP address as well as the source port of such packets should be used with care. It is recommended that the source IP address of any active trace or probe configuration packet should have the source address as the initial starting point. The source port must be a well known port assigned for this purpose. As an example, it could be port 7, which is assigned by the Internet Assigned Numbers Authority (IANA) for the well known UDP/TCP echo facility.

The second phase, dynamic filter setup, begins when the probe manager has the necessary information regarding the beginning and the end of the measured path as well as packet filter information. The probe manager begins the second phase by wrapping a special filter packet and sending it to the starting probe proxy. The packet sent by probe manager 200 to starting point proxy 110 is a UDP packet with the destination address pointing to the proxy itself. The source port should be a well-known port indicating a configuration probe packet, or some other unique identifier such as a specific identifier (often referred to as a magic number or cookie) as a part of the packet payload. It should be noted that the filter packet is the same as the traced packets; however, its payload contains all necessary packet filter attributes. In other words, the filter packet will look like the traffic to be traced, with a payload used for the initial filter packet setup. The packet is unwrapped by the tracing entity and then sent by the tracing entity down the path to the destination. All the tracing entities on the path, for example routers 120, 130, 170, and 150, will either set up their own filters using the information extracted from the intercepted filter packet, or refuse to set up the filter, but in any case they will forward this configuration packet along the path.

Because the packet sent by probe manager 200 or proxy 110 is a single packet which will not be retransmitted based on any form of feedback (such as a NAK) because there is no entity responsible for the retransmission of the packet, and the packet may be lost, it may be desirable to send multiple copies of the configuration packet to the destination to guarantee that all filters along the path are set up.

Due to the possibility of dynamic routing changes, filter configuration packets should be resent by probe manager 200 or proxy 110 to cover possible routing path changes. The frequency will depend on the nature of the routing changes. If, for example, filter specified data is missing from a specific tracing entity but present from other tracing entity, this may indicate a path change. Sending a filter packet through tracing entities that already have the same configuration will only refresh filter attributes, e.g. filter TTL, and more importantly will establish a filter on tracing entities which were not previously configured, and by doing so provide coverage for the new path. Eventually filters on the old path will expire. The probe manager may have the option of directly communicating with any tracing entity under its control to remove a specific filter.

As an example, if the route shown in FIG. 1 shifts from router 130 through router 170 to router 150 to passing from router 130 through router 140 to router 150, router 140 has not been previously configured with the desired filters. When probe manager 200 retransmits the filter configuration packet, the unwrapped packet reaches router 120, which already has a filter established. The effect of the newly transmitted filter configuration packet is to reset the Time To Live (TTL) value for router 120. The filter configuration packet continues through router 130, resetting its TTL value. The filter configuration packet then reaches router 140, where a new filter is established. Propagating further to router 160, its TTL is refreshed. As the newly transmitted filter configuration packet did not reach router 170 previously on the packet path, the filter established on router 170 will expire before the filters on routers 120, 130, 140, and 150 expire.

It may be desirable to selectively trace traffic through the network, for example by specifying domains and providing group identification. As an example, referring once again to FIG. 1, routers 130 and 140, and any tracing entities they contain could be grouped and identified as a "north" path, with routers 170 and 180 and any tracing entities they contain grouped and identified as a "south" path. Filters at tracing entities on router 160 could then distinguish between the groups.

As the filter configuration packet mimics real traffic, it may be desirable to prevent this packet from reaching the destination system. Limiting the propagation of the filter configuration packet may be implemented in many ways. As examples, forwarding of the filter configuration packet may be limited to a specific number of hops. The filter configuration packet may instruct a particular tracing entity to stop forwarding. The filter configuration packet may be stopped when a tracing entity recognizes proximity to the destination. As shown in FIG. 1, limiting forwarding to 4 hops, specifying that the tracing entity at router 150 stop forwarding, or having the tracing entity stop forwarding if it would forward to path 160 will all achieve the desired result.

The third phase, data collection, begins once filters are set up along the route. The tracing entities containing active filters passively monitor traffic and start collecting data (usually in the form of packet header fingerprint plus timestamp) on real traffic described by the filter. Collected data may be transmitted to the measuring station as it is collected, or buffered and sent on the occurrence of an event, such as a periodic time-out, or buffer full event. If sufficient processing power is available at the tracing entity, aggregation and/or processing of trace information may be performed, resulting in the transmission of aggregated information to the monitoring entity. Data from the tracing entity may be encrypted prior to transmission. The data is analyzed at the measurement station. As shown in FIG. 1, collected data for example from routers 120 and 130 travels through router 170 to measuring entity 300.

The foregoing detailed description of the present invention is provided for the purpose of illustration and is not intended to be exhaustive or to limit the invention to the precise embodiments disclosed. Accordingly the scope of the present invention is defined by the appended claims.

What is claimed is:

1. A method of tracing packets from a source to a destination in a switched network comprising:
   establishing starting and ending points for the tracing operation,
   sending filter configuration packets from the starting to ending points to establish dynamic packet filters in tracing entities along the route to be traced,
   detecting traffic at the tracing entities with dynamic packet filters and collecting trace information, and
   sending the trace information to a monitoring station.

2. The method of claim 1 where the step of sending filter configuration packets is repeated.

3. The method of claim 1 where the filter configuration packet mimics the traffic to be traced.

4. The method of claim 1 where the dynamic packet filters have a specified lifetime after which they expire.

5. The method of claim 1 where multiple filters are established for tracing different types of traffic.

6. The method of claim 1 where the step of sending filter configuration packets starts with the step of a probe manager sending a UDP packet to a starting node where the UDP packet is unwrapped and forwarded to the destination mimicking the traffic to be traced.

7. The method of claim 1 where the filter configuration packet is authenticated by the starting point.

8. The method of claim 1 where the filter configuration packet is authenticated by at least one of the tracing entities.

9. The method of claim 1 where tracing entities are grouped into domains with a group ID so that tracing can be conducted only within those domains.

10. The method of claim 1 where tracing entities report failure in instantiating a filter to the initiating entity.

11. The method of claim 1 where tracing entities report success in instantiating a filter to the initiating entity.

12. The method of claim 1 where the last tracing entity stops the forwarding process.

13. The method of claim 12 where the forwarding process is stopped based on the number of hops from the starting point.

14. The method of claim 12 where the forwarding process is stopped based on proximity to the destination.

15. The method of claim 1 where the trace information sent to the monitoring station is encrypted.

16. The method of claim 1 where the trace information is timestamped at the tracing entity.

17. The method of claim 1 where trace information is collected at the tracing entity prior to being sent to the monitoring station.

18. The method of claim 1 where the trace information is aggregated at the tracing entity prior to being sent to the monitoring station.

* * * * *